United States Patent
Goncalves et al.

(10) Patent No.: US 10,780,873 B2
(45) Date of Patent: Sep. 22, 2020

(54) RAIL VEHICLE BRAKING SYSTEM AND BRAKING METHOD FOR A RAIL VEHICLE COMPRISING SUCH A SYSTEM

(71) Applicant: FAIVELEY TRANSPORT AMIENS, Amiens (FR)

(72) Inventors: Claudino Goncalves, Ribeaucourt (FR); Jérémie Sales, Amiens (FR); Roberto Correndo, Carmagnola (IT)

(73) Assignee: FAIVELEY TRANSPORT AMIENS, Amiens (FR)

( * ) Notice: Subject to any disclaimer, the term of this patent is extended or adjusted under 35 U.S.C. 154(b) by 0 days.

(21) Appl. No.: 16/081,047

(22) PCT Filed: Mar. 1, 2017

(86) PCT No.: PCT/FR2017/050462
§ 371 (c)(1),
(2) Date: Aug. 30, 2018

(87) PCT Pub. No.: WO2017/149245
PCT Pub. Date: Sep. 8, 2017

(65) Prior Publication Data
US 2019/0092306 A1   Mar. 28, 2019

(30) Foreign Application Priority Data
Mar. 4, 2016   (FR) ...................................... 16 51828

(51) Int. Cl.
*B60T 17/08*   (2006.01)
*B60T 13/26*   (2006.01)
(Continued)

(52) U.S. Cl.
CPC .......... *B60T 17/086* (2013.01); *B60T 13/266* (2013.01); *B60T 13/665* (2013.01); *B60T 17/08* (2013.01); *B60T 17/083* (2013.01); *B60T 17/16* (2013.01); *B60T 17/228* (2013.01); *F16D 55/2245* (2013.01); *F16D 2127/06* (2013.01)

(58) Field of Classification Search
CPC . B61H 5/00; B60T 11/10; B60T 13/26; B60T 13/266; B60T 13/665; B60T 17/16;
(Continued)

(56) References Cited

U.S. PATENT DOCUMENTS 3,874,747 A  *  4/1975  Case ....................... B60T 17/16
                                                        303/89
9,550,504 B2 *  1/2017  Boisseau ................ B61H 13/00
(Continued)

FOREIGN PATENT DOCUMENTS

EP    2 154 040 A1    2/2010
EP    2 202 122 A1    6/2010
(Continued)

OTHER PUBLICATIONS

International Search Report, dated Jun. 27, 2017, from corresponding PCT/FR20171050462 application.
(Continued)

*Primary Examiner* — Christopher P Schwartz
(74) *Attorney, Agent, or Firm* — Christopher R. Carroll; The Small Patent Law Group LLC

(57) ABSTRACT

Disclosed is a rail braking system including a detection and storage device designed to receive first information representing the position of a device for locking a service brake piston, to receive second information representing the supply of a service brake pressure chamber with a pneumatic pressure agent, to deduce information representing the application of a parking brake from the first and second information, and to store the deduced information; as a result of which the information representing the application of the parking brake is kept even if the service brake pressure chamber is no longer supplied with the pneumatic pressure agent.

23 Claims, 8 Drawing Sheets

(51) Int. Cl.
*B60T 17/16* (2006.01)
*B60T 13/66* (2006.01)
*B60T 17/22* (2006.01)
*F16D 55/224* (2006.01)
*F16D 127/06* (2012.01)

(58) Field of Classification Search
CPC ........ B60T 17/228; B60T 11/14; B60T 13/20; F16D 55/224; F16D 65/18; F16D 65/183
USPC ....... 188/71.8, 153 D, 3 R, 3 H, 153 R, 265; 303/9, 9.76, 89, 127, 128
See application file for complete search history.

(56) References Cited

U.S. PATENT DOCUMENTS

| | | | |
|---|---|---|---|
| 9,956,971 B2* | 5/2018 | Gerber-Papin | B61H 13/00 |
| 10,351,120 B2* | 7/2019 | Goncalves | B61H 5/00 |
| 10,494,002 B2* | 12/2019 | Thomas | B61H 5/00 |
| 2010/0044165 A1* | 2/2010 | Argirovski | F16D 55/2245 188/71.8 |
| 2010/0155185 A1 | 6/2010 | Goncalves | |
| 2018/0148075 A1* | 5/2018 | Thomas | B60T 17/228 |
| 2019/0092299 A1* | 3/2019 | Crochu | B61H 5/00 |

FOREIGN PATENT DOCUMENTS

| | | |
|---|---|---|
| WO | 2012/038277 A2 | 3/2012 |
| WO | 2014/026936 A1 | 2/2014 |

OTHER PUBLICATIONS

First Office Action dated Apr. 16, 2020 for corresponding Chinese Application No. 201780015051.3 (7 pages).

* cited by examiner

RAIL VEHICLE BRAKING SYSTEM AND BRAKING METHOD FOR A RAIL VEHICLE COMPRISING SUCH A SYSTEM

FIELD OF THE INVENTION

The invention concerns the field of rail vehicle brakes.

It more particularly concerns the rail vehicle braking systems provided with a service brake and with a parking brake configured to act on a braking linkage.

It also concerns the braking methods for rail vehicles comprising such braking systems.

TECHNOLOGICAL BACKGROUND

Rail vehicles are generally equipped with service brake cylinders comprising a piston movable under the effect of a fluid under pressure, the movement of that piston driving a braking action such as the clamping of a disk brake between two linings, or the direct pressure of a block against a vehicle wheel.

These brake cylinders also generally comprise a parking or emergency actuator which is actuated in case of pressure loss of the fluid under pressure and/or in case of intentional venting (or draining) or leakage of the pneumatic system. This actuator, also termed parking brake, makes it possible to provide braking by virtue of the load of one or more springs substituting for the load of the fluid. Once this parking brake has been activated, the brake remains continuously engaged.

A rail vehicle braking system is known from European patent application EP 2 154 040 which is provided with a parking brake actuator coupled to a rail service brake cylinder. This brake cylinder comprises a body and a piston which is movable relative to the body to act on the braking linkage via a thrust rod.

The brake cylinder also comprises a pressure chamber delimited by the piston and by the body and which is connected by a pipe to a source of pneumatic pressure agent to put the piston into a service braking position.

The parking brake comprises a body which is distinct from the brake cylinder body. The body of the parking brake has an opening facing the piston of the service brake cylinder, which opening slidingly receives a thrust sleeve fitting into that opening in a fluid-tight manner.

The parking brake also comprises a piston movably mounted in a cylinder attached to the body and delimiting with that body a parking brake pressure chamber. This parking brake pressure chamber is connected to another source of pneumatic pressure agent via a pipe. The piston comprises at its center an aperture passed through by the thrust sleeve.

The parking brake further comprises one or more springs which continuously bias the piston of that parking brake towards a position referred to as low in which the parking brake is considered as being in a working configuration.

To actuate the parking brake when the piston of the service brake cylinder is in service braking position, the pressure chamber of the parking brake (filled in advance with the pneumatic pressure agent) is vented and the spring or springs of the parking brake then act on the piston of the parking brake, which drives the sleeve until the latter comes to bear against the piston of the service brake cylinder.

The pressure chamber of the service brake cylinder may then be vented since the parking brake has been actuated.

The load applied by the parking brake on the service brake piston is directly related to the load produced by the springs. This load naturally depends on the stiffness and the extension of those springs.

With this braking system, the force applied on the braking linkage by the piston of the service brake cylinder when the parking brake has been actuated and the service brake cylinder has been vented is often less than the force applied by that same piston when it is in service braking position.

SUBJECT OF THE INVENTION

The invention concerns a rail vehicle braking system, having improved performance relative to the braking systems of the above-mentioned prior art, while being simple, convenient and economic.

According to a first aspect, the invention is thus directed to a rail vehicle braking system having brakes with at least one lining or at least one block, comprising a body, a braking linkage configured to act on at least one said brake, a service brake comprising a braking piston movable relative to said body to act on said braking linkage and delimiting with said body a service brake pressure chamber configured to be supplied by a first source of pneumatic pressure agent to place said braking piston in a service braking position, as well as a parking brake configured to act on said braking piston of said service brake and having a working configuration and a resting configuration;

said parking brake comprising a blocking device movable relative to said body to act on said braking piston and having a first position and a second position in which said blocking device is configured to immobilize said braking piston in service braking position, said parking brake then being in working configuration, and a control device movable relative to said body and having a locking position in which said control device is configured to hold said blocking device in its second position;

said rail vehicle braking system being configured to supply the service brake pressure chamber with another pneumatic pressure agent of which the pressure is determined, so as to apply a determined braking force when said parking brake is in working configuration; and said rail vehicle braking system further comprising a detection and memorization device configured to receive a first information item representing the position of the blocking device, receive a second information item representing the supply of the service brake pressure chamber by the other pneumatic pressure agent, deduce from said first and second information items representing an information item representing the application of the parking brake, and memorize said deduced representing information item; whereby said information item representing the application of the parking brake is kept even if the service brake pressure chamber is no longer supplied by the other pneumatic pressure agent.

In the braking system according to the invention, the braking piston is immobilized in service braking position by the parking brake and in particular by its blocking device. This means that the braking piston may be immobilized in any position, which position is linked to the travel which that piston has travelled and that travel depends on the force applied in the service braking phase.

By the term immobilize is meant the fact that the force applied by the braking piston on the braking linkage in the working configuration of the parking brake does not reduce, or almost not.

A certain loss is however accepted linked to the retraction of the braking piston, in particular on the slight movement of the piston relative to the blocking device, at the time the service brake pressure chamber is vented. This loss is controlled and is defined by a very slight reduction in the force applied which is due in particular to the manufacturing tolerances both of the blocking device and of the braking piston. This reduction in the force applied on the braking linkage is here called losses on retraction. An acceptable value for these losses on retraction is at maximum of the order of 10% to 15% of the force applied by the service brake at the time the parking brake is actuated to be in working configuration.

The configuration of the braking piston and of the parking brake makes it possible in particular to dispense with the spring or springs of the known braking systems described above which make it possible to apply the parking brake force on the braking linkage via the service brake cylinder piston. Thus, for the same force applied on the braking linkage when the parking brake is in working configuration, the braking system according to the invention is more compact than the aforementioned braking systems of the prior art, and also lighter.

It should be noted that the braking linkage advantageously has deformable arms of which the elasticity may substitute for that of the springs of the known braking systems described above.

It should be noted that the configuration of the parking brake is chosen such that the load applied directly by the blocking device to immobilize the braking piston is not generally greater than the load applied by the springs on the piston of the aforementioned braking systems of the prior art; while the force applied on the braking linkage when the parking brake of the system according to the invention is in working configuration is preferably at least equal to or even greater than that procured by the aforementioned braking systems of the prior art.

The braking system according to the invention may furthermore make it possible to momentarily supply the service brake pressure chamber with the other pneumatic pressure agent in order to increase the braking force applied to the braking linkage by the service brake piston. The braking force applied to the braking linkage when the parking brake is in its working configuration is therefore increased further by it.

The system according to the invention may thus make it possible to obtain braking forces in particular parking brake braking forces greater than those obtained with the aforementioned braking systems of the prior art, simply, conveniently and economically, while affording particularly good safety provision.

What is more, detecting the position of the blocking finger makes it possible to give an information item relative to the state of immobilization or non-immobilization of the service braking piston; whereas detecting a pressure value in the service brake pressure chamber arising from the other pressure agent (below called third pneumatic pressure agent), which differs from the first pressure agent, makes it possible to know that service braking has not been applied.

The correlation between the representing information items detected makes it possible to deduce simply and conveniently the state of the parking brake and in particular to ensure that the parking brake is applied at a time t.

The memorization of the deduced representing information item furthermore makes it possible to ensure, at a time t+1, that the parking brake has indeed been applied at the time t.

This memorization function is particularly convenient for example when the user (driver) of the rail vehicle takes this again several hours or days after its immobilization. The natural leakages of the system do not enable it to be ensured that the service brake pressure chamber remains supplied by the other pressure agent and that chamber may even be vented (without deliberate action). That being the case, the information item representing the supply of this chamber may have disappeared. The memorization of the information item deduced as to the fact that the parking brake has indeed been applied makes it possible to supply a reliable indication to the user.

It will moreover be noted that the first pneumatic pressure agent generally makes it possible to supply the service brake pressure chamber when the parking brake is not in working configuration, to apply a service braking force, in accordance with a service brake setting. This same first pneumatic pressure agent may also make it possible to supply the service brake pressure chamber when the parking brake is not in working configuration, to apply an emergency braking force rather than a service braking force, in accordance with an emergency brake setting. It may be considered here that the emergency brake force is a service brake force which is modified by an emergency parameter.

According to preferred, simple, convenient and economical features of the system according to the invention:

said control device delimits with said body a parking brake pressure chamber configured to be supplied by a second pneumatic pressure agent, and having a locking position in which said control device is configured to keep said blocking device in its second position; and said first representing information item is a pressure value of said second pneumatic pressure agent taken in a parking brake pipe supplying said parking brake pressure chamber;

said rail vehicle braking system comprises a dedicated first pneumatic distribution device connected to a source of supply of pneumatic pressure agents and connected to said parking brake pressure chamber in order to supply it with said second pneumatic pressure agent or vent it to place said parking brake respectively in its resting and working configurations, as well as a dedicated second pneumatic distribution device connected to said source of supply of pneumatic pressure agents and connected to said service brake pressure chamber in order to supply it with the other, referred to as third, pneumatic pressure agent of which the pressure value is determined, so as to apply a determined braking force when said parking brake is in working configuration; said first and dedicated second pneumatic distribution devices being configured to be controlled by at least one control signal.

said detection and memorization device comprises a body, a detection piston movably mounted in the body and defining with that latter a first detection chamber and a second detection chamber distinct from the first detection chamber, an elastic return member disposed in the second detection chamber and configured to act on the detection piston, what is referred to as a memory member moveably mounted also in the body, defining with the latter a locking chamber in fluidic communication with the second detection chamber, and being configured to act on the detection piston via a return spring, so as to keep that detection piston in a predetermined position;

the body comprises a first detection aperture opening into the first detection chamber and communicating with a first detection pipe connected to a pipe supplying the service brake pressure chamber; the first detection chamber being configured to be supplied, via the first detection pipe, by the other, referred to as third, pneumatic pressure agent when it supplies the service brake pressure chamber and to be vented when it does not supply the service brake pressure chamber;

the body comprises a second detection aperture opening into the second detection chamber and communicating with a second detection pipe connected to a pipe supplying the parking brake pressure chamber; the second detection chamber being configured to be supplied, via the second detection pipe, by second pneumatic pressure agent when it supplies the parking brake pressure chamber and to be vented when it does not supply the parking brake pressure chamber;

said detection and memorization device further comprises an indication unit with several indicator lights and having a supply signal, a switch and a return spring cooperating with the switch; and said detection and memorization device is configured such that the movement of the memory member in the body makes it possible to act on the switch against the return spring to supply one of the indicator lights;

said detection and memorization device is configured such that, when the parking brake pressure chamber is vented, the second detection chamber and the locking chamber are not supplied, the detection piston is acted upon by the elastic return member, the memory member is acted upon by the return spring, as regards the first detection chamber, this is supplied by the other, so-called third, pneumatic pressure agent and acts upon the detection piston against the return member; so as to place the detection piston in a first state in which the memory member comes to hold it in position;

said detection and memorization device is configured such that, when the parking brake pressure chamber is supplied, the second detection chamber and the locking chamber are supplied, the detection piston is acted upon by the elastic return member and also by the second pneumatic pressure agent, the memory member is moved against the return spring, as regards the first detection chamber, this is not supplied by the third pneumatic pressure agent; such that the detection piston is therefore in a second state in which the memory member does not act on the latter;

the detection piston has a groove formed on the periphery of the detection piston, located towards the second detection chamber, and the memory member is housed in a cavity of the body and is provided with an end head configured to come into engagement in the groove provided on the detection piston when the latter is in a first state in which the memory member comes to keep it in position;

the detection piston furthermore has a rib formed on the periphery of the detection piston, located towards the second detection chamber, and the body is provided with a shoulder against which said rib is configured to come into engagement, when the detection piston is in a second state in which the memory member does not act on the latter;

the detection piston is brought into its second state by a first force equal to the sum of the loads applied by the second pressure agent and by the return member; i.e. respectively approximately the parking brake pressure value multiplied by the surface area of the detection piston on which acts that parking brake pressure, added to the load applied by the return member;

the detection piston is brought into its first state by a second force equal here to approximately the pressure value of the other, referred to as third, pneumatic pressure agent, multiplied by the surface area of the detection piston on which that other agent acts, at the location of a free end of the detection piston;

the second force is greater than the load applied by the return member such that, in the first state of the detection piston, its rib is at a distance from the shoulder of the body and its groove is aligned with and facing the end head of the memory member;

the detection piston is subjected, at a free end, to the second force and remotely opposite its free end, to the first force; and the detection and memorization device is configured here such that the first force is greater than the second force;

said detection and memorization device comprises a first controller configured to receive said first representing information item and a second controller configured to receive said second representing information item;

said detection and memorization device further comprises two conditional management members each provided with a switch, with a return member cooperating with the respective switch and each receiving a supply signal, a first of the two conditional management members being connected by a first section of pipe to a pipe supplying the parking brake pressure chamber, and is also connected by a second section of pipe to both the first controller and to the second controller, and a second of the two conditional management members is connected by a third section of pipe to a pipe supplying the service brake pressure chamber and is also connected by a fourth section of pipe to the second controller.

said actuator is configured to receive a setting for parking brake application by a dedicated first control line; whereas the actuator is configured to receive a parking brake application setting by a dedicated second control line; the first controller is configured to electrically supply or not supply an indicator light by virtue of an electricity supply source, and the second controller is interposed on the first control line, configured to cause the parking brake application setting to be conveyed or not conveyed to the actuator, and configured to electrically supply or not supply an indicator light by virtue of an electricity supply source;

the first controller comprises a first electric coil connected to the second section of pipe, a first switch configured to be actuated to a working position by the first electric coil when it is powered, and a return spring configured to return the switch to a resting position when the first electric coil is not powered; and the second controller comprising a second electric coil connected to the fourth section of pipe, a third electric coil connected to the second section of pipe, as well as a second switch and a third switch mechanically connected to the second switch by an interface; the second and third switches being configured to be actuated together to a working position by the second electric coil when it is powered and the third electric coil is not powered, and to a resting position by the third electric coil when it is powered and the second electric coil is not powered;

the first distribution device is controlled to enable the parking brake pressure chamber to be vented, the switch of the first of the two conditional management members does not establish an electrical path between the supply and the second section of pipe and does not power the first and third electric coils, the first switch of the first controller is not acted upon by the first coil and does not establish an electrical path between the supply and the indicator light which is off, the second distribution device enables the service brake pressure chamber to be supplied with the third pneumatic pressure agent, the switch of the second of the two conditional management members establishes an electrical path between the supply and the fourth section of pipe and powers the second electric coil, the second and third switches are actuated into their working position by the second coil, thus establishing an electrical path between the supply and the indicator light which is on; so as to indicate that the parking brake is applied; and/or the first distribution device is controlled to enable the parking brake pressure chamber to be supplied, the switch of the first of the two conditional management members establishes an electrical path between the supply and the second section of pipe and powers the first and third electric coils, the first switch is acted upon by the first coil and establishes an electrical path between the supply and the indicator light which is on, the switch of the second of the two conditional management members does not establish an electrical path between the supply and the fourth section of pipe and thus does not power the second electric coil, the second and third switches are actuated into their resting position by the third coil, cutting the electrical path between the supply and the indicator light which is off and authorizing the parking brake signal to pass to the actuator of the second distribution device.

According to a second aspect, the invention also relates to a method of braking a rail vehicle, comprising a rail vehicle braking system as described above, comprising:

the step of receiving an information item representing the position of the blocking finger;

the step of receiving an information item representing the supply by another pneumatic pressure agent of the service brake pressure chamber;

the step of deducing said received representing information items, an information item representing the application of the parking brake; and the step of memorizing said deduced representing information item.

The method according to the invention is particularly simple and convenient to implement, while also being particularly safe.

According to preferred, simple, convenient and economical features of the method according to the invention, it comprises in advance, simultaneously or successively whatever the order is, the steps of controlling the movement of the blocking finger into its second position so as to place the parking brake in its working configuration and to control the supply of the service brake pressure chamber with the other pneumatic pressure agent so as to apply a determined braking force.

BRIEF DESCRIPTION OF THE DRAWINGS

The disclosure of the invention will now be continued with the description of embodiments, given below by way of non-limiting illustration, with reference to the accompanying drawings, in which.

DETAILED DESCRIPTION OF AN EMBODIMENT

Figure 1:
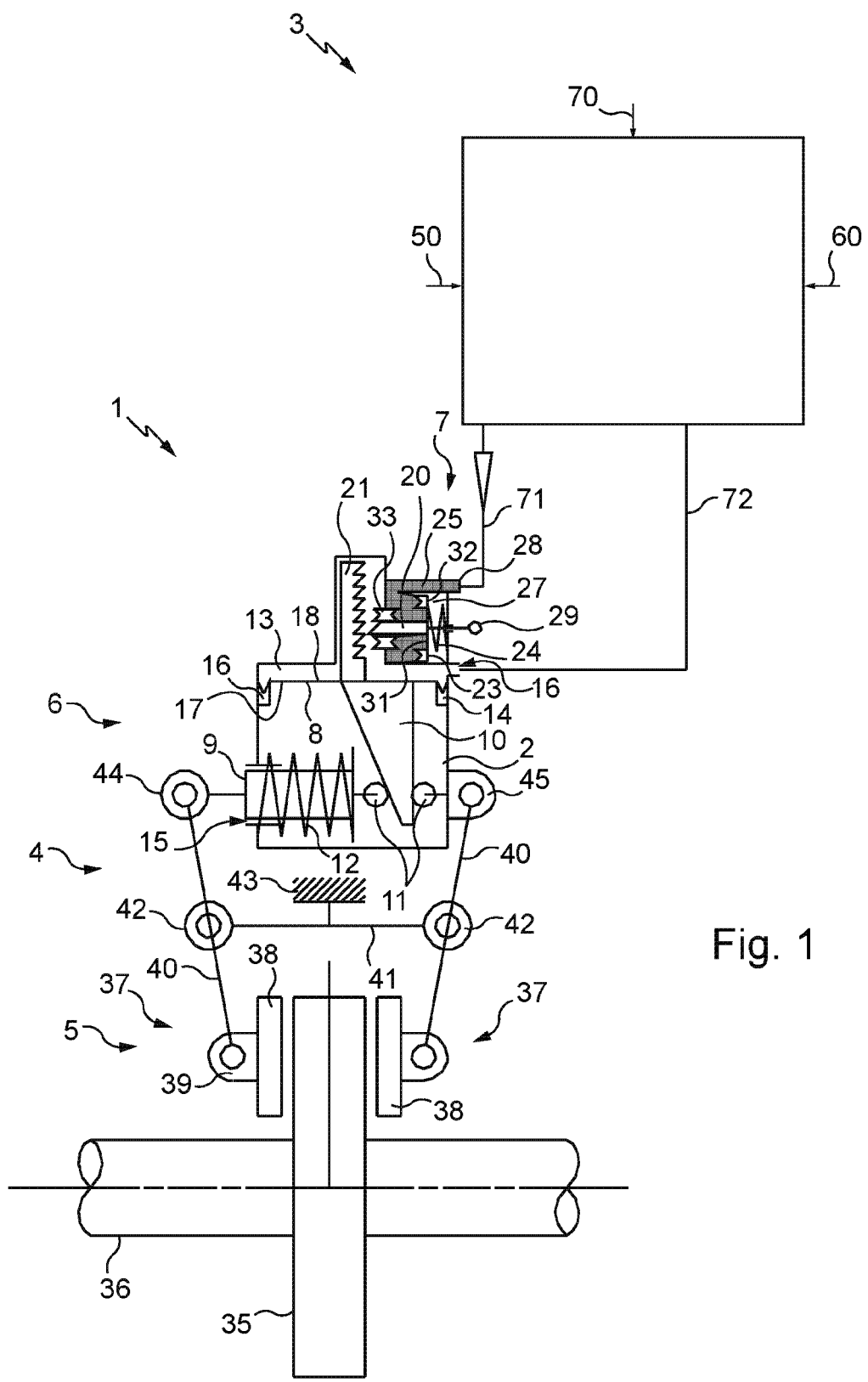
FIG. 1 diagrammatically and partially illustrates a rail vehicle braking system in accordance with a first embodiment of the invention, which system is provided in particular with a service brake, with a parking brake and with a control and actuation unit.

FIG. 1 diagrammatically represents a rail vehicle braking system 1 for a rail vehicle with a brake having linings or blocks.

The rail vehicle braking system 1 comprises a body 2 here forming a cylinder of a service brake 6 and a parking brake 7, a control and actuation unit 3 configured to manage the operation of the service brake 6 and of the parking brake 7, a conveyance network of pneumatic pipes that is connected to the body 2 and to the control and actuation unit 3, a braking linkage 4 mechanically linked to the body 2 as well as a brake 5 with linings on which the braking linkage 4 is configured to act.

The body 2 here has the form of a generally closed envelope.

The service brake 6 comprises a service brake piston 8 movable relative to the body 2 in a first axial direction, and a thrust rod 9 also movable relative to the body 2 in a second axial direction perpendicular to the first axial direction.

Together with the body 2 the braking piston 8 delimits a service brake pressure chamber 13.

The braking piston 8 has two sides respectively a first side 17 configured to act on the braking linkage 4 via the thrust rod 9 and a second side 18 which is an opposite side to the first side 17 and which is turned towards the service brake pressure chamber 13.

The service brake 6 further comprises a notched rod 21 fastened to the second side 18 of the braking piston 8. This notched rod 21 extends longitudinally in the first axial direction.

The braking piston 8 is configured to move in the body 2 while maintaining the service brake pressure chamber 13 relatively fluid-tight thanks to a membrane 14, for example formed by a seal, disposed between that braking piston 8 and inside edges of the body 2.

The service brake 6 further comprises a wedge part 10 fastened to the first side 17 of the braking piston 8.

This wedge part 10 has a triangular section and is configured to cooperate with a set of rolling bearing stops 11, of which one of the rolling bearing stops is linked to the body 2 while the other of the rolling bearing stops is linked to the thrust rod 9.

This thrust rod 9 is provided with a wear adjuster configured to compensate for the wear of the linings of the brake 5 in order to avoid reduction of the braking force by excessive play (further to wear of the linings).

The service brake 6 further comprises a spring 12 here disposed around the thrust rod 9, between the rolling bearing stop which is linked to the latter and an inside edge of the body 2. This spring 12 is configured to return the stop which is linked to the thrust rod 9 against the wedge part 10.

The service brake 6 further comprises a first aperture 15 formed in the body 2 and configured to enable the movement of the thrust rod 9 through that first aperture 15.

The service brake 6 further comprises a second aperture 16 formed in the body 2 and opening into the service brake pressure chamber 13.

Figure 2:
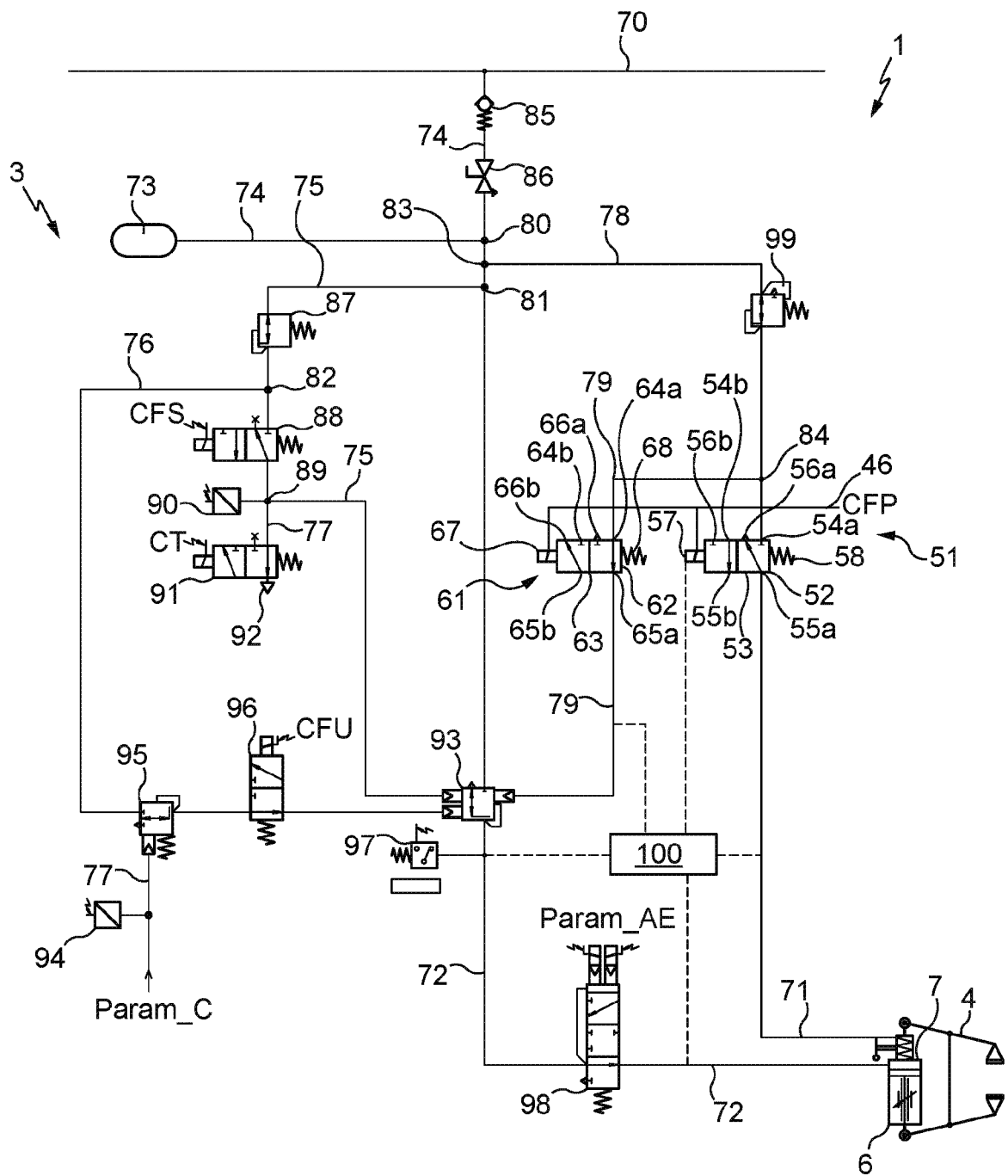
FIG. 2 diagrammatically represents in more detail the control and actuation unit illustrated in FIG. 1 and a conveyance network of pipes of the system which is connected to that unit, which unit is in particular provided with first and second pneumatic distribution devices connected to the parking brake and with a device for detection and memorization of the application of the parking brake.

The service brake pressure chamber 13 is connected here by a first supply pipe 72 of the conveyance network of pneumatic pipes, more generally called brake pipe, connected at the location of that second aperture 16, to a source of supply of pneumatic pressure agents 73 (visible in FIG. 2).

The body 2 comprises a cavity 27 situated against the service brake pressure chamber 13 and in which is disposed the parking brake 7.

The parking brake 7 comprises a blocking device here formed by a blocking finger 20 movable relative to the body 2 and extending in the second axial direction.

The parking brake 7 further comprises here a holding piston 23 movable relative to the body 2 and with the latter delimiting a parking brake pressure chamber 25.

This holding piston 23 has two sides, respectively a first side 31 on which is attached the blocking finger 20 and which is turned towards the parking brake pressure chamber 25, and a second side 32 which is an opposite side to the first side.

The parking brake 7 further comprises here a spring member 24 disposed between the body 2 and the second side 32 of the holding piston 23. This spring member 24 is configured to act on that holding piston 23 and therefore on the blocking finger 20.

It should be noted that the holding piston 23 and the spring member 24 here form a movable actuating device of the parking brake 7.

The holding piston 23 is configured to move in the body 2 while maintaining the parking brake pressure chamber 25 relatively fluid-tight thanks to a membrane (not referenced) disposed between that holding piston 23 and the inside edges of the body 2.

The parking brake 7 comprises a third aperture (not shown) formed in the body 2 and opening both into the parking brake pressure chamber 25 and into the service brake pressure chamber 13, which third aperture is configured to enable the movement of the blocking finger 20 through that third aperture.

It should be noted that the relative sealing between the parking brake pressure chamber 25 and the service brake pressure chamber 13 is ensured by the presence of a seal 33 disposed at the interface between that third aperture and the blocking finger 20.

The parking brake 7 further comprises a fourth aperture 28 formed in the body 2 and opening into the parking brake pressure chamber 25.

This parking brake pressure chamber 25 is connected here by a second supply pipe 71 of the conveyance network of pneumatic pipes, also called parking brake pipe, which is connected at the location of that fourth aperture 28, to the source of supply of pneumatic pressure agents 73 (visible in FIG. 2) via the unit 3.

The parking brake 7 further comprises an unlocking part 29 attached to the second side 32 of the holding piston 23 and opening outside the body 2 through a fifth aperture (not shown) formed in that body 2 and opening into the cavity 27; such that this unlocking part 29 is accessible to be manipulated from outside the body 2, if required.

It will be noted that this unlocking part 29 may comprise a visual indicator, for example a colored bellows, so as to visibly indicate the state of this part 29.

As a variant, the unlocking part 29 may be coupled to a visual indication system provided with a switch mechanically connected to that part 29 and having a first position and a second position (see below with reference to FIGS. 3, 4 and 13 to 16).

The service brake 6 is disposed in the body 2 and is configured to act on the brake 5 via the braking linkage 4.

This brake 5 comprises a brake disk 35 (here viewed from above) mounted for example on a rail vehicle axle 36, or directly on the wheel to brake.

This brake 5 further comprises two shoes 37 each provided with a lining 38 configured to be applied in contact with the disk 35 to reduce its rotational speed and therefore that of the wheel to brake, as well as a fastening eye 39 provided at the remote opposite location to the surface of the lining 38 that is configured to be applied to the disk brake 35.

The braking linkage 4 comprises two or four deformable levers 40 each provided with an upper portion and a lower portion which are attached to each other. Only two levers are illustrated here and, in the case of the linkage having four levers, they may be attached in pairs or as a variant be independent from each other.

Each portion of the levers 40 is jointed to a central connector 41 via two pivots 42.

The lower portion of each deformable lever 40 is linked to one of the shoes 37 via its fastening eye 39.

The upper portion of each deformable lever 40 is linked to a respective joint 44, 45.

The braking linkage 4 receives the body 2 between the upper portions of the deformable levers 40, at the location of the joints 44 and 45.

The body 2 is rotatably mounted on the joint 44 which is attached to an end of the thrust rod 9 whereas it has a fixed mounting to the joint 45, which is directly attached to that body 2.

The braking linkage 4 also comprises a fastening lug 43 joined to the central connector 41 for the mounting of that braking linkage 4 on the rail vehicle; in order for the brake shoes 37 to be situated on respective opposite sides of the brake disk 35 (or of the wheel of the rail vehicle).

It should be noted that the coming towards each other of the joints 44 and 45 enables the shoes 37 to move apart from each other and that conversely, the separation of those joints 44 and 45 enables the shoes 37 to be to clamped onto the brake disk 35 (or onto the rail vehicle wheel).

The control and actuation unit 3 is connected to the service brake pressure chamber 13 via the first supply pipe 72 to which it is connected; while that unit 3 is also connected here to the parking brake pressure chamber 25 via the second supply pipe 71 to which it is connected. Furthermore, this unit 3 is supplied with pneumatic agents by a main pipe 70 which passes generally along the rail vehicle.

The control and actuation unit 3 comprises system members (not shown) which are configured to receive and process representational information relative to operational settings of the rail vehicle, by a first electrical and/or pneumatic and/or manual type channel, denoted 50 in FIG. 1.

These system members are furthermore configured to receive and process representational information relative to parameters of use of the rail vehicle, by a second channel of electrical and/or pneumatic and/or manual type, which is denoted 60 in FIG. 1.

These system members may for example be formed by pneumatic relays and/or solenoids and/or pressure switches and/or sensors and/or pressure reducing valves and/or electrical relays and/or electronic cards and/or central processing units or microprocessors, and/or random access memory components comprising registers adapted to record variables of the parameters created and modified during the execution of programs, and/or communication interfaces configured to send and receive data, and/or internal storage members, such as hard disks, able in particular to store the executable code of programs enabling the management of the service and parking brakes 6 and 7.

It will be noted that in FIG. 1, the control and actuation unit 3 is associated with a braking linkage and with a single brake 5 of the rail vehicle. As a variant, such a control and actuation unit may be associated with an axle (not shown) of the rail vehicle, provided with a plurality of brakes 5, or with a bogie (not shown) of the rail vehicle, provided with two axles, or for instance with a wagon (not shown) of the rail vehicle, provided with two bogies, or it is possible for the rail vehicle to comprise only one such control and actuation unit.

FIG. 2 diagrammatically represents in more detail the conveyance network of pneumatic pipes and the control and actuation unit 3.

The main pipe 70 forms the channel for conveyance of a pneumatic agent distributed in the conveyance network of pneumatic pipes. The agent in this main pipe 70 is for example at a pressure value of approximately 9 bars.

The network may comprise what is referred to as a general pipe (not shown), distinct from the main pipe 70, and generally extending in parallel thereto. The general pipe also enables pneumatic continuity to be ensured along the rail vehicle and may authorize the service braking of the vehicle, by directly using the fluid passing through the general pipe. As regards the main pipe 70, this enables equipment particularly for example of the rail vehicle braking system to be supplied, and in particular the source of supply of pneumatic pressure agents 73 here formed by what is referred to as an auxiliary reservoir.

This network further comprises, as described in more detail below, a filling and distribution pipe 74 which is tapped onto (that is to say directly connected to) the main pipe 70, a service brake pipe 75 connected by a tapping 81 onto the filling and distribution pipe 74, an emergency brake pipe 76 tapped onto the service brake pipe 75 by a tapping 82, as well as a control pipe 78 connected by a tapping 83 also onto the filling and distribution pipe 74.

The control pipe 78 is subdivided into two pipes at the location of a branch tapping 84, respectively into the parking brake pipe 71 directly communicating with the parking brake pressure chamber 25 and into an oversupply pipe, referred to hereinafter as preset pipe 79.

Each service brake pipe 75, emergency brake pipe 76 and preset pipe 79, joins the brake pipe 72 which directly communicates with the service brake pressure chamber 13.

The filling and distribution pipe 74 has a first filling section extending between the tapping (not shown) onto the main pipe 70 and the auxiliary reservoir 73, as well as a second distribution section extending from a tapping 80 onto the first section.

The control and actuation unit 3 here comprises a one-way valve 85 disposed on the first section of the filling and distribution pipe 74 near the tapping of the latter onto the main pipe 70, as well as an isolation tap 86 also disposed on that first section.

The non-return valve 85 enables the filling of the auxiliary reservoir 73 by the pneumatic pressure agent coming from the main pipe 70 and prohibits the venting of the reservoir 73 into the main pipe 70 if the pressure in the latter becomes less than that in the auxiliary reservoir 73.

The control and actuation unit 3 further comprises here a relay device 93, or pneumatic relay, supplied by the second distribution section of the filling and distribution pipe 74 and connected to the brake pipe 72.

This relay device 93 is configured to generate, from that second distribution section and from template values of pressure, a pressure of use at a determined throughput for the filling of the service brake pressure chamber 13.

These template values of pressure correspond here to service brake and emergency brake pressure settings and preset, respectively coming from the service brake pipe 75, the emergency brake pipe 76 and from the preset pipe 79.

The control and actuation unit 3 here further comprises, on the service brake pipe 75, a pressure reducing valve 87 configured to limit the pressure value for example here to approximately 4 bars as well as a distribution device 88 here formed by a monostable solenoid valve and configured to receive a control signal corresponding to a service brake setting CFS.

When the setting value CFS is null, the distribution device 88 is configured to interrupt the service brake pipe 75; and when the setting value CFS is not null, the device 88 is configured to authorize the passage of a pneumatic pressure agent, called first pressure agent, to the relay device 93 which receives a service brake pressure template value and which generates a service brake pressure to supply the service brake pressure chamber 13 for the braking of the vehicle.

The control and actuation unit 3 further comprises a pressure sensor 90 connected to a tapping 89 onto the service brake pipe 75 and which makes it possible to control the service brake pressure template value.

The control and actuation unit 3 further comprises a venting solenoid valve 91 connected by the tapping 89 onto the service brake pipe 75 and which makes it possible to vent that pipe via a venting aperture 92 on that solenoid valve 91.

The solenoid valve 91 is monostable and configured to receive a control signal corresponding to a work setting CT and to operate in reverse.

When the setting value CT is not null, the solenoid valve 91 is configured to interrupt the communication of the service brake pipe 75 with the venting aperture 92; and when the setting value CT is null, that solenoid valve 91 is configured to allow the communication of that pipe 75 with that venting aperture 92.

The control and actuation unit 3 further comprises here, on the emergency brake pipe 76, a distribution device 96 formed here by a monostable solenoid valve operating in reverse and configured to receive a control signal corresponding to an emergency brake setting CFU.

When the setting value CFU is not null, the distribution device 96 is configured to interrupt the emergency brake pipe 76; and when the setting value CFU is null, the device 96 is configured to authorize the passage of a pneumatic pressure agent to the relay device 93 which receives an emergency brake pressure template value and which generates an emergency brake pressure to supply the service brake pressure chamber 13 for the braking of the vehicle.

The control and actuation unit 3 further comprises a pressure limiter 95 (or pressure reducing valve) on the emergency brake pipe 76 upstream of the distribution device 96, which limiter 95 is controlled according to a load parameter param_C of the vehicle received via a load pipe 77 connected to the limiter 95; and a pressure sensor 94 tapped onto the load pipe 77.

The load parameter param_C is an information item representing the vehicle load and may for example concern a single wagon, or several successive wagons or the entirety of the rail vehicle. This depends on the number of braking systems in accordance with the invention and the strategy of brake actuation.

It will furthermore be noted that certain parameters of operation of certain rail vehicles may naturally (or initially) be dependent on the vehicle load for example to manage the service brake whereas others are not dependent on the vehicle load.

The control and actuation unit 3 comprises on the brake pipe 72, a pressure switch 97 downstream of the relay device 93 and configured to check whether or not a pneumatic pressure agent, has a pressure value at least greater than a predetermined threshold value, in the brake pipe 72 and therefore whether there is a pressure in the service brake pressure chamber 13.

The control and actuation unit 3 further comprises on the brake pipe 72 an anti-wheel-slide device 98 here formed by a monostable solenoid valve and configured to receive control signals which correspond to anti-wheel-slide parameters Param_AE of the vehicle; so as to ensure the effectiveness of the rail vehicle braking.

These anti-wheel-slide parameters Param_AE are information items representing the anti-wheel-slide or the wheel-slide of the vehicle and may for example correspond to the load of the vehicle, to its speed of locomotion as well as to the service and/or emergency brake template values.

The control and actuation unit 3 comprises on its control pipe 78 a pressure reducing valve 99 configured to limit the pressure value for example here to approximately 6 bars.

The control and actuation unit 3 comprises a dedicated first pneumatic distribution device 51 on its parking brake pipe 71 and a dedicated second pneumatic distribution device 61 on its preset pipe 79.

The first pneumatic distribution device 51 is formed by a first distributor 52, here monostable, also called solenoid valve, provided with a movable slide 53 with two positions, with a single inlet aperture 54 (denoted 54a or 54b in the drawings) connected to the control pipe 78, with a single outlet aperture 55 (denoted 55a or 55b in the drawings) connected to the parking brake pipe 71, and with an aperture 56 (denoted 56a or 56b in the drawings) opening into the atmosphere.

The first distributor 52 is furthermore provided with an actuator 57 configured to move the slide 53 from its first position to its second position according to a control signal received by that actuator 57, and with a return member 58 configured to bring the respective slide 53 back from its second position to its first position without being acted upon by the actuator 57.

The second pneumatic distribution device 61 is formed by a second distributor 62 which is monostable here, or solenoid valve, provided with a movable slide 63 which has two positions, with a single inlet aperture 64 (denoted 64a or 64b in the drawings) connected to the control pipe 78 via the preset pipe 79, with a single outlet aperture 65 (denoted 65a or 65b in the drawings) connected to the brake pipe 72 via the preset pipe 79 and the relay device 93, and with an aperture 66 (denoted 66a or 66b in the drawings) opening into the atmosphere.

The second distributor 62 is furthermore provided with an actuator 67 configured to move the slide 63 from its first position to its second position according to a control signal received by that actuator 67, and with a return member 68 configured to bring the respective slide 63 back from its second position to its first position without being acted upon by the actuator 67.

The control and actuation unit 3 further comprises a dedicated control device configured to control the first and second pneumatic distribution devices 51 and 61.

This control device of the first and second pneumatic distribution devices here comprises a control line 46 directly linked to the actuators 57 and 67 of the first and second pneumatic distribution devices 51 and 61 and configured to convey a parking brake application setting CFP.

Figure 3:
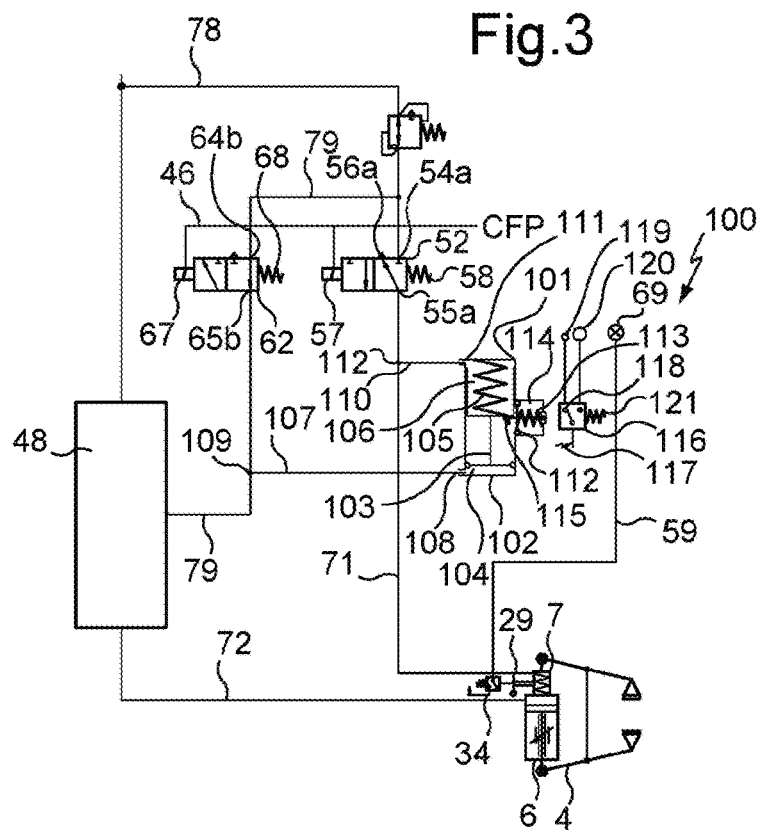
FIGS. 3 and 4 are similar to FIG. 2, the device for detection and memorization of the application of the parking brake being shown diagrammatically and in accordance with a first embodiment, respectively in a first state and in a second state.

When the parking brake application setting CFP is null, this means that the parking brake 7 must be applied here (FIGS. 2 and 3). This is what is referred to as a security application.

According to requirement, the first distributor 52 has a first so-called safety position by default in which its single outlet aperture 55a connected to the parking brake pressure chamber 25 via the parking brake pipe 71 communicates with its aperture opening into the atmosphere 56a, whereas its single inlet aperture 54a connected to the auxiliary reservoir 73 via the control pipe 78 and the supply and distribution pipe 74 is obturated (FIGS. 2 and 3).

The parking brake pressure chamber 25 is then vented and the blocking finger 20 comes to immobilize the rod 21 of the piston 8. The parking brake is applied.

As regards the second distributor 62, this has a first position by default which is also referred to as a safety position, in which its single outlet aperture 65a connected to the service brake pressure chamber 13 via the brake pipe 72 communicates with its single inlet aperture 64a connected to the auxiliary reservoir 73 via the control pipe 78 and the supply and distribution pipe 74, whereas its aperture 66a to the atmosphere is obturated (FIGS. 2 and 3).

The second distributor 62 thus authorizes the passage of a pneumatic pressure agent, referred to as third pressure agent, to the relay device 93 which receives a preset pressure template value and which generates a preset pressure to supply the service brake pressure chamber 13.

To remove the application of the parking brake 7 (FIG. 4), a non-null setting for application of the parking brake CFP passes in the control line 46 to the actuators 57 and 67 which move the slides 53 and 63 of the first and second distributors 52 d 62 against the return members 58 and 68.

Figure 4:
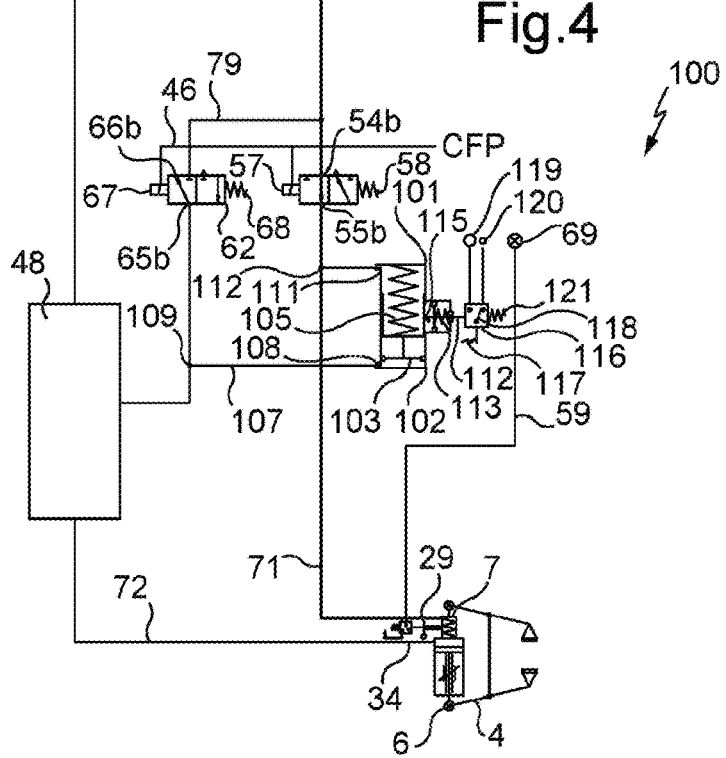

If required, the first distributor 52 has a second position in which its single outlet aperture 55b connected to the parking brake pressure chamber 25 via the parking brake pipe 71 communicates with its single inlet aperture 54b connected to the auxiliary reservoir 73 via the control pipe 78 and the supply and distribution pipe 74, whereas its aperture opening into the atmosphere 56b is obturated (FIG. 4).

The first distributor 52 thus authorizes the passage of a pneumatic pressure agent, referred to as second pressure agent, directly to the parking brake pressure chamber 25 via the parking brake pipe 71. The blocking finger 20 is then withdrawn into that chamber and releases the rod 21 of the piston 8.

As regards the second distributor 62, this has a second position in which its single outlet aperture 65b is connected to its aperture 66b open to the atmosphere, whereas its single inlet aperture 64b connected to the auxiliary reservoir 73 via the control pipe 78 and the supply and distribution pipe 74 is obturated (FIG. 4).

The second distributor 62 thus prohibits the passage of the third pneumatic pressure agent to the relay device 93 which thus does not receive the preset pressure template value and which vents the preset pressure if required.

The control and actuation unit 3 further comprises a dedicated detection and memorization device 100 configured for detecting the application of the parking brake 7 and for memorizing the information that the parking brake is applied, even when the brake pipe 72 and/or the preset pipe 79 no longer conveys a pneumatic pressure agent for example on account of natural leakages of the system 1.

This detection and memorization device 100 for the application of the parking brake 7 is configured to receive an information item representing the supply of the service brake pressure chamber 13 by the third pneumatic pressure agent via the second distributor 62, and to receive an information item representing the venting of the parking brake pressure chamber 25 via the first distributor 52.

This detection and memorization device 100 may be configured to retrieve these information items directly from the parking brake pipe 71 and/or from the preset pipe 79, after the second distributor 62, and/or from the brake pipe 72, between the service brake pressure chamber 13 and the anti-wheel-slide device 98 or between the latter and the relay device 93 (dashed lines in FIG. 2).

FIGS. 3 and 4 represent in more detail the detection and memorization device 100, according to a first embodiment. To simplify the drawings, the conveying and system members described hereinabove with reference to FIG. 2, in particular concerning the service brake, the emergency brake, the venting, the relaying and the anti-wheel-slide, are grouped together here in a sub-unit referenced 48 (this will also be the case in FIGS. 11 and 16).

This detection and memorization device 100 comprises a body 102, a detection piston 103 movably mounted in the body 102 and defining with the latter a first detection chamber 104 and a second detection chamber 106 distinct from the first detection chamber 104 and an elastic return member 105 disposed in the second detection chamber 106 and configured to act on the detection piston 103.

The detection and memorization device 100 further comprises what is referred to as a memory member 112 movably mounted also in the body 102, defining with the latter a locking chamber 114 (visible in FIGS. 5 and 8) and being configured to act on the detection piston 103, via a return spring 113, so as to maintain that piston 103 in a predetermined position.

The locking chamber 114 is in fluidic communication with the second detection chamber 106.

The body 102 comprises a first detection aperture 108 opening into the first detection chamber 104 and communicating with a first detection pipe 107 which is connected by a tapping 109 to the preset pipe 79, here between the second distributor 62 and the relay device 93.

The first detection chamber 104 is configured to be supplied, via the first detection pipe 107, by the third pneumatic pressure agent passing in the preset pipe 79 when the second distributor 62 authorizes the passage of that pressure agent (FIG. 3); whereas that chamber 104 is vented when the single outlet aperture 65b of the second distributor 62 communicates with its aperture 66b opening into the atmosphere (FIG. 4).

The body 102 further comprises a second detection aperture 111 opening into the second detection chamber 106 and communicating with a second detection pipe 110 which is connected by a tapping 112 to the parking brake pipe 71.

The second detection chamber 106 is configured to be supplied, via the second detection pipe 110, by the second pneumatic pressure agent passing in the parking brake pipe 71 when the first distributor 52 authorizes the passage of that pressure agent (FIG. 4); whereas that chamber 106 is vented when the single outlet aperture 55b of the first distributor 52 communicates with its aperture 56b opening into the atmosphere (FIG. 3).

The detection and memorization device 100 further comprises an indication unit 116 having a supply signal 117, a switch 118 and a return spring 121 cooperating with the switch 118. This indication unit 116 is connected here to two indicator lights 119 and 120, which are distinct.

The detection and memorization device 100 is configured such that the movement of the memory member 112 in the body makes it possible to act on the switch 118 against the return spring 121 to supply the indicator light 120, which is thus on. Without the switch being acted upon, it is the indicator light 119 which is supplied and thus on.

In FIG. 3, the parking brake pressure chamber 25 is vented such that the parking brake 7 is applied. The second detection chamber 106 and the locking chamber 114 are not supplied such that the detection piston 103 is acted upon by the elastic return member 105 and the memory member 112 is acted upon by the return spring 113. As regards the first detection chamber 104, this is supplied by the third pneumatic pressure agent and acts on the detection piston 103 against the return member 105; so as to place the detection piston 103 in a first state in which the memory member 112 comes to hold it in position. The memory member 112 is then in a first position in which it does not act on the switch 118 and it is thus the indicator light 119 which is supplied and on; to indicate that the parking brake 7 is applied.

Holding the detection piston 103 in its first state makes it possible to memorize the information that the parking brake is applied, even when the brake pipe 72 and/or the preset pipe 79 no longer convey a pneumatic pressure agent for example on account of natural leakages of the system 1.

In FIG. 4, the parking brake pressure chamber 25 is supplied such that the parking brake 7 is not applied. The second detection chamber 106 and the locking chamber 114 are supplied such that the detection piston 103 is acted upon by the elastic return member 105 and also by the second pneumatic pressure agent, and the memory member 112 is moved against the return spring 113. As regards the first detection chamber 104, this is not supplied by the third pneumatic pressure agent. The detection piston 103 is thus in a second state in which the memory member 112 does not act on the latter. The memory member 112 is in a second position in which it acts on the switch 118 and it is thus the indicator light 120 which is supplied and on; to indicate that the parking brake 7 is not applied.

It will be noted that the unlocking part 29 of the parking brake 7 is coupled here to the visual indication system provided with a switch 34 mechanically connected to that part 29, with an electricity supply line (not shown) connected to the switch 34, with an elastic return member (not shown) actuating the switch 34 into a first position, and with a transfer line 59 connected to the switch 34 and extending to a visual indicator such as an indicator light 69.

For example, when the unlocking part 29 is not acted upon, the switch 34 is actuated by the return member into its first position in which no electrical path is established between the electricity supply line and the transfer line 59, such that the indicator light 69 is not supplied and is thus off; whereas when the unlocking part 29 is acted upon, the switch 34 is moved against the return member from its first position to a second position, in which an electrical path is established between the electricity supply line and the transfer line 59, such that the indicator light 69 is supplied and is thus on to indicate that the braking piston 8 is not held in position. Of course, the inverse operation is possible (the light would be on when the braking piston is held).

FIGS. 5 to 8 illustrate a first sequence making it possible to detect and memorize that the parking brake 7 has been applied.

In FIGS. 5 to 8, the memory member 112 and the indication unit 116 are housed in a cavity 190 of the body 102.

The memory member 112 is provided with a seal 194 on a periphery to delimit with the body 102 the locking chamber 114 and with an end head 115 configured to come into engagement against the detection piston 103.

The detection piston 103 has a seal 191 on a periphery to delimit, with the body, both the first detection chamber 104 and the second detection chamber 106.

The detection piston 103 furthermore has a groove 193 as well as a rib 192 here adjacent to the groove 193 and each formed on the periphery of the detection piston 103, located towards the second detection chamber 106.

The groove 193 is configured to receive, in engagement therewith, the end head 115 of the memory member 112 when the latter is in its first position and the detection piston 103 is in its first state.

As regards the rib 192, this is configured to come into engagement against a shoulder 196 provided in the body 102, when the detection piston 103 is in its second state.

Figure 5:
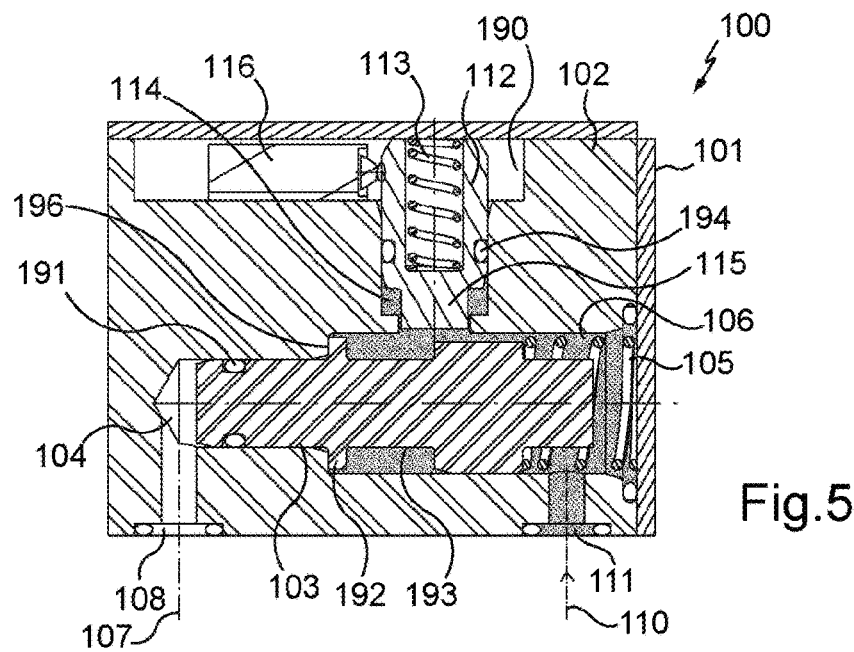
FIGS. 5 to 8 represent in more detail the detection and memorization device illustrated in FIGS. 3 and 4, in different configurations according to a first operating sequence.

In FIG. 5, the second detection chamber 106 and the locking chamber 114 are supplied such that the detection piston 103 is acted upon both by the elastic return member 105 and also by the second pneumatic pressure agent, and the memory member 112 is moved against the return spring 113.

As in FIG. 4, this means that the parking brake pressure chamber 25 is supplied.

As regards the first detection chamber 104, this is on the contrary not supplied by the third pneumatic pressure agent.

The detection piston 103 is thus brought into its second state by a first force equal to the sum of the loads applied by the second pressure agent and by the return member 105; i.e. respectively approximately the parking brake pressure value multiplied by the surface area of the detection piston 103 on which acts that parking brake pressure, added to the load applied by the return member 105.

In this second state of the piston 103, the rib 192 of the piston is in engagement against the shoulder 196 of the body 102, the end head 115 of the memory member 112 is at a distance from the piston 103 and this memory member 112 is in its second position in which it acts on the switch 118 of the indication unit 116; so as to indicate that the parking brake 7 is not applied.

Figure 6:
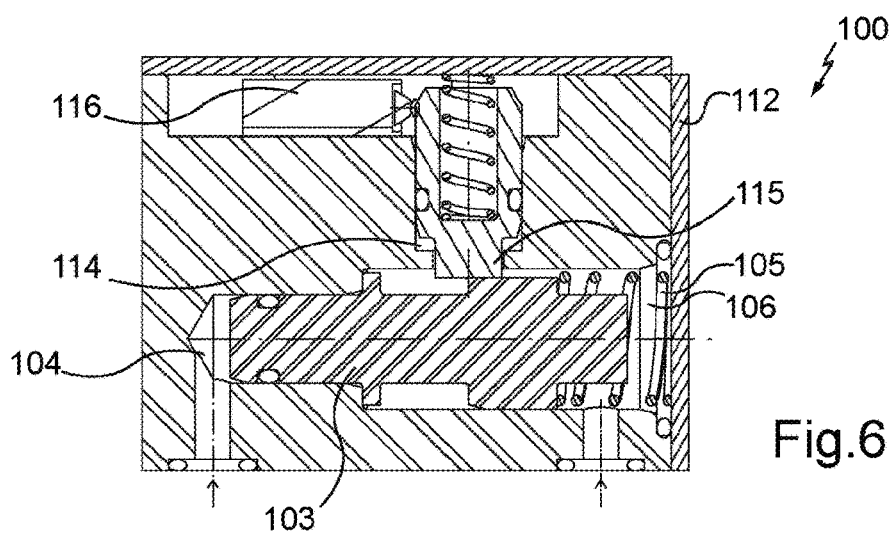

In FIG. 6, the second detection chamber 106 and the locking chamber 114 are vented by the actuation of the first distributor 52.

The detection piston 103 is solely acted upon under the load applied by the return member 105 and remains in its second state.

As regards the memory member 112, this is acted upon by the return spring 113 and its end head 115 comes to be applied, in an intermediate position, on the periphery of the detection piston 103.

In the second state of the detection piston 103, its groove 193 is offset relative to the end head 115 of the memory member 112 and is not opposite thereto, such that the latter does not hold the detection piston 103 in position.

What is more, in the intermediate position of the memory member 112, the latter continues to act on the switch 118 of the indication unit 116 to indicate that the parking brake 7 is not applied.

Figure 7:
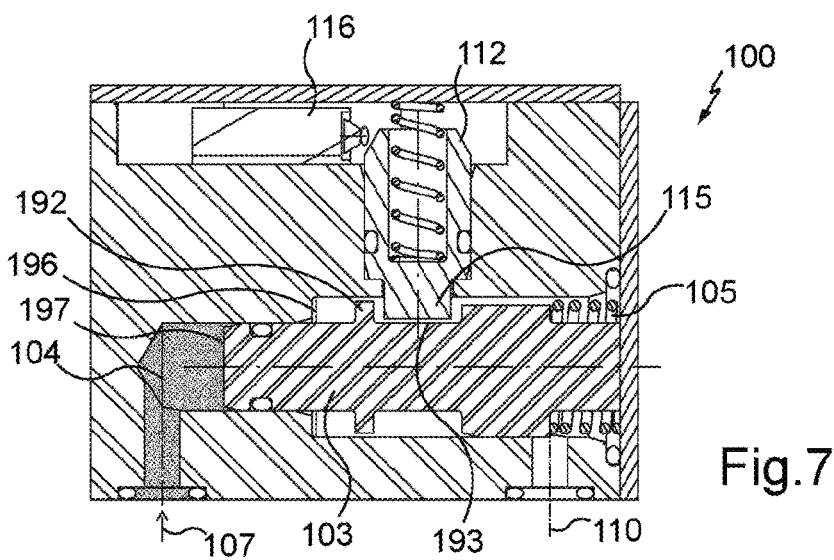

In FIG. 7, the first detection chamber 104 is supplied by the third pneumatic pressure agent by the actuation of the second distributor 62 and the detection piston 103 is acted on against the return member 105.

As in FIG. 3, this means that the service brake pressure chamber 13 is supplied by the third pneumatic pressure agent.

On the contrary, the second detection chamber 106 and the locking chamber 114 remain vented.

The detection piston 103 is thus brought into its first state by a second force here equal to approximately the preset pressure value multiplied by the surface area of the piston 103 on which that preset pressure acts.

This second force is greater than the load applied by the return member 105 such that, in this first state of the piston 103, its rib 192 is at a distance from the shoulder 196 of the body 102 and its groove 193 is aligned with and facing the end head 115 of the memory member 112.

The memory member 112 is actuated by the return spring 113 into its first position, in which its end head 115 comes into engagement in the groove 193 of the piston 103 in order to keep the latter in position, in its first state.

In the first position of the memory member 112, the latter no longer acts on the switch 118 of the indication unit 116, which is moved to change the supply of the indicator light, in order to indicate that the parking brake 7 is henceforth applied.

Figure 8:
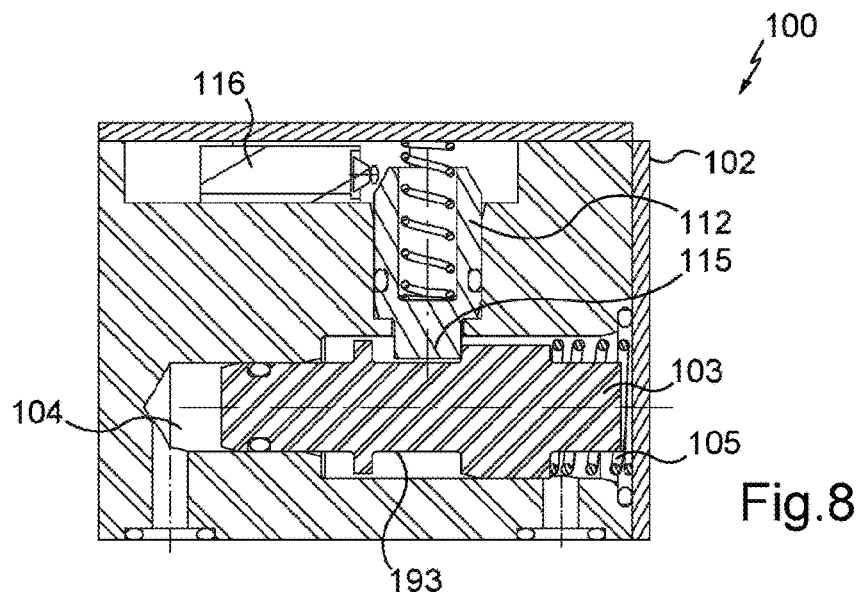

In FIG. 8, the first detection chamber 104 is no longer supplied by the third pneumatic pressure agent, for example on account of natural leakages from the system 1 and here from the preset pipe 79.

The detection piston 103 has been slightly moved under the action of the elastic return member 105 but remains held in its first state by the cooperation between the end head 115 of the memory member 112 and the groove 193 of the piston 103.

The indication that the parking brake 7 is applied thus remains memorized.

Figure 9:
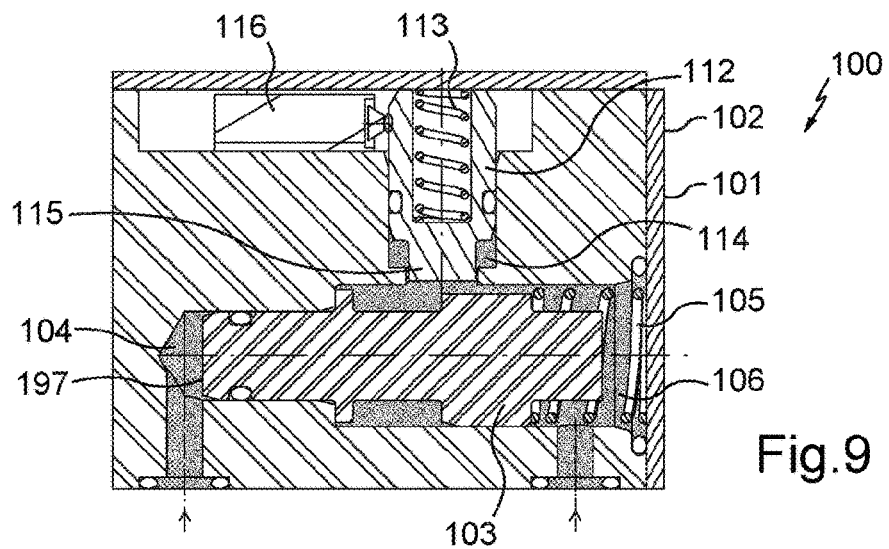
FIGS. 9 and 10 represent variants of configurations replacing the configurations of FIGS. 6 and 7, to illustrate a second operating sequence of the detection and memorization device illustrated in FIGS. 3 and 4.
Figure 10:
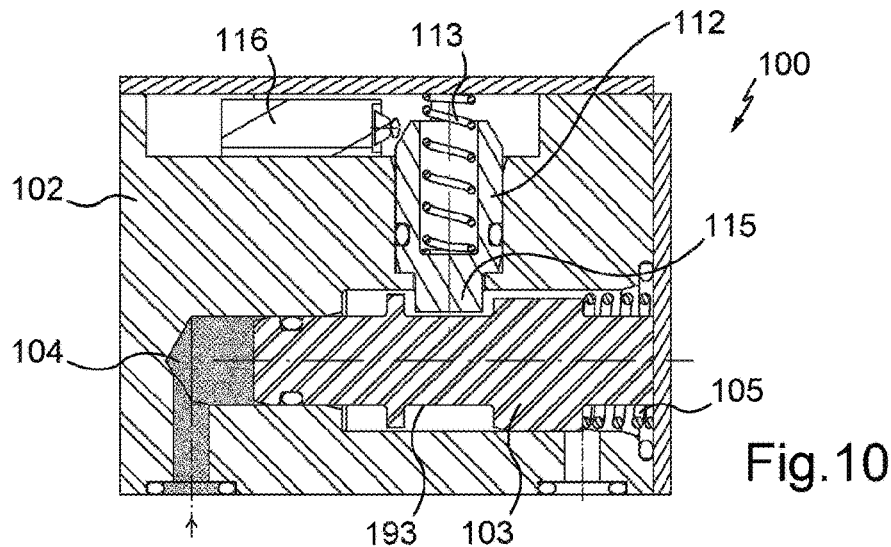

FIGS. 9 and 10, associated with FIGS. 5 and 8, illustrate a second sequence making it possible to detect and memorize that the parking brake 7 has been applied. FIG. 9 replaces FIG. 6 and FIG. 10 replaces FIG. 7. The configurations of FIGS. 5 and 8 are not repeated.

In FIG. 9, the second detection chamber 106 and the locking chamber 114 are still supplied by the second pneumatic pressure agent via the parking brake pipe 71; whereas the first detection chamber 104 is also supplied by the third pneumatic pressure agent by virtue of the actuation of the second distributor 62.

The detection piston 103 is subjected, at its free end 197, to the second force here equal approximately to the preset pressure value multiplied by the surface area of the piston 103 on which that preset pressure acts; and the piston 103 is also subjected, remotely opposite its free end 197, to the first force equal to the sum of the loads applied by the second pressure agent and by the return member 105.

The detection and memorization device 100 is configured here such that the first force is greater than the second force in order for the detection piston 103 to remain in its second state.

The memory member 112 is in its second position in which it acts on the switch 118 of the indication unit 116 so as to indicate that the parking brake 7 is not applied.

In FIG. 10, the second detection chamber 106 and the locking chamber 114 are vented by the actuation of the first distributor 52.

The detection piston 103 is still subjected, at its free end 197, to the second force but is now only subjected, remotely opposite its free end 197, to the force applied by the return member 105.

As the second force is greater than the load applied by the return member 105, the detection piston 103 is thus brought into its first state in which its rib 192 is at a distance from the shoulder 196 of the body 102 and its groove 193 is aligned with and facing the end head 115 of the memory member 112.

The memory member 112 is actuated by the return spring 113 into its first position, in which its end head 115 comes into engagement in the groove 193 of the piston 103 in order to keep the latter in position, in its first state.

In the first position of the memory member 112, the latter no longer acts on the switch 118 of the indication unit 116, which is moved to change the supply of the indicator light, in order to indicate that the parking brake 7 is henceforth applied.

Figure 11:
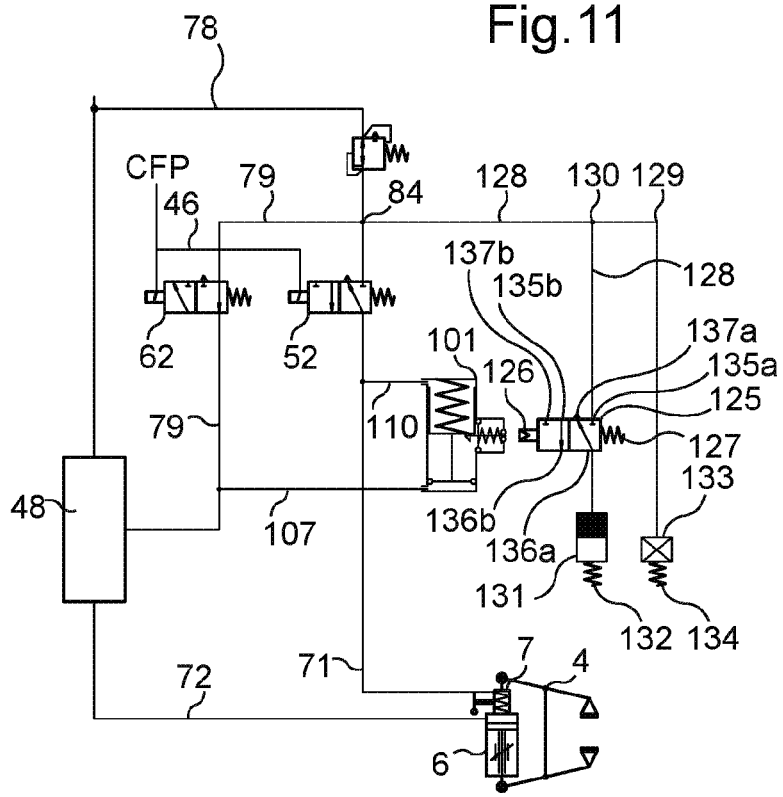
FIGS. 11 and 12 represent a first variant embodiment of the detection and memorization device illustrated in FIGS. 3 and 4.
Figure 12:
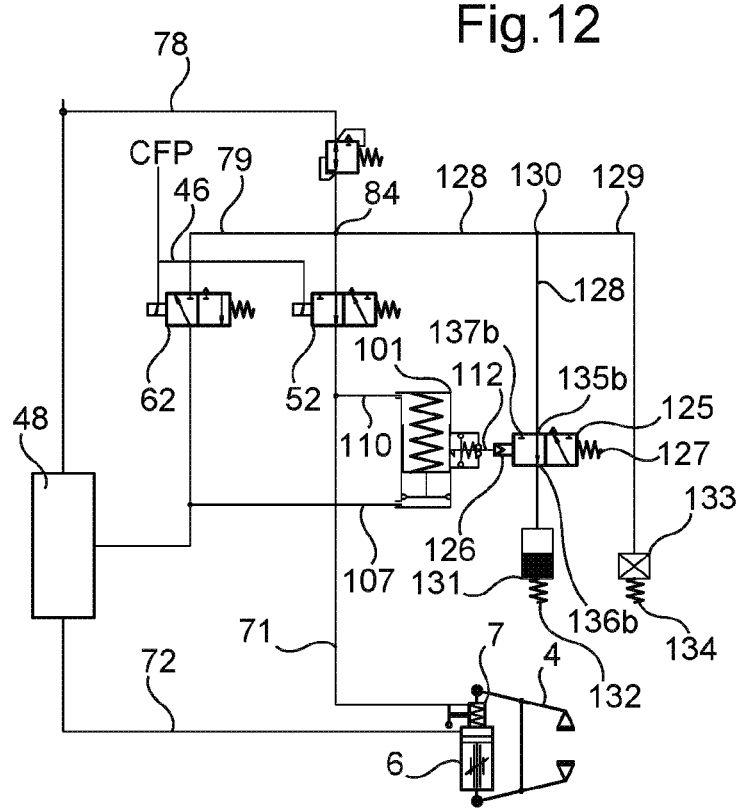

In FIGS. 11 and 12, which are similar to FIGS. 3 and 4, the indication unit of the detection and memorization device is formed by a distributor 125 of the monostable pneumatic valve type, having a movable slide with two positions controlled by an actuator 126 itself controlled by the memory member 112 described above, and by a return member 127.

In a second position (FIG. 11), this distributor 125 has an inlet aperture 135*a* which is obturated and connected to a management pipe 128 which is connected by the tapping 84 to the control pipe 78, an outlet aperture 136*a* connected to a visual indicator 131 having two positions and a return spring 132, as well as an aperture 137*a* opening into the atmosphere and communicating with the outlet aperture 136*a*.

The distributor 125 is here in its first position when the memory member 112 does not act on the actuator 126 and the parking brake 7 is applied.

In a second position (FIG. 12), this distributor 125 has an inlet aperture 135*b* communicating with the outlet aperture 136*b* and supplying by a pneumatic pressure agent the visual indicator 131 which passes from one position to the other against the spring 132; whereas the aperture 137*b* is obturated.

The distributor 125 is here in its second position when the memory member 112 acts on the actuator 126 and the parking brake 7 is not applied.

Optionally, the indication unit of the detection and memorization device is also provided with an indicator having a cross 133 which has a return spring 134 and is also connected to the control pipe 78 via an auxiliary pipe 129 itself connected by a tapping 130 to the management pipe 128.

Figure 13:
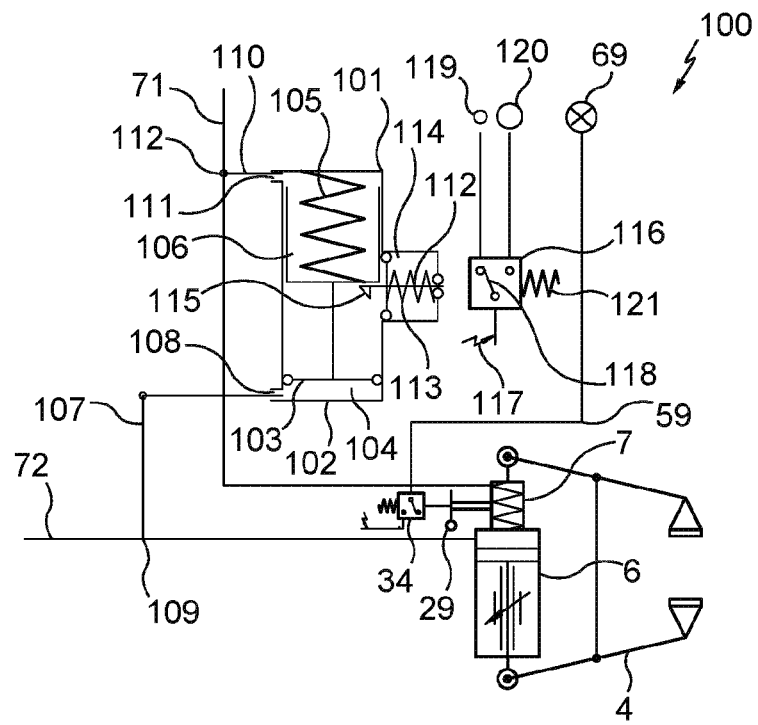
FIGS. 13 and 14 represent a second variant embodiment of the detection and memorization device illustrated in FIGS. 3 and 4.
Figure 14:
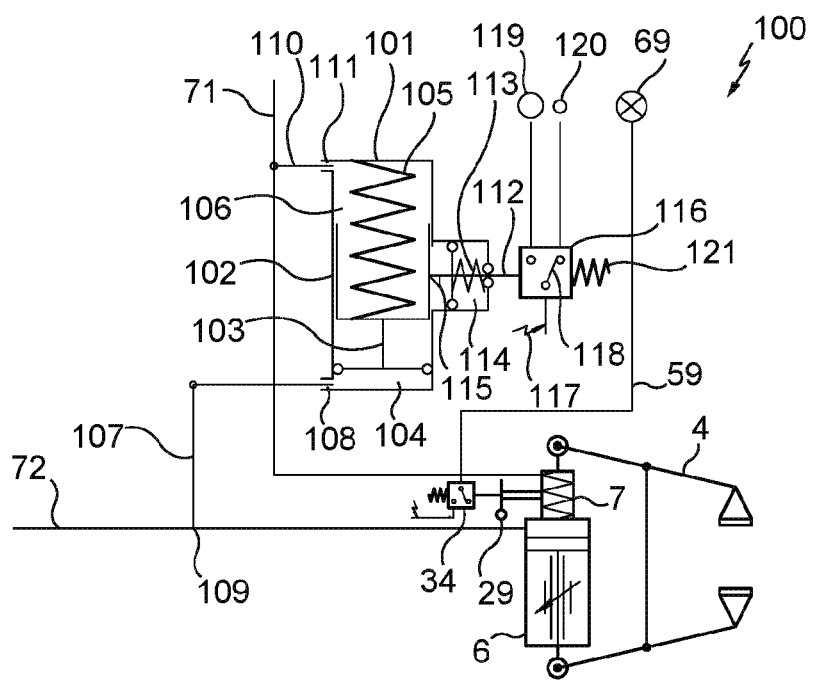

FIGS. 13 and 14 are identified in FIGS. 3 and 4, with the exception of the fact that the detection and memorization device 100 is configured here such that the first detection pipe 107 is directly connected to the brake pipe 72 (that is to say after the relay device, and before or after the anti-wheel-slide) rather than to the preset pipe 79. The operation of this device can be deduced from the description given above.

Figure 15:
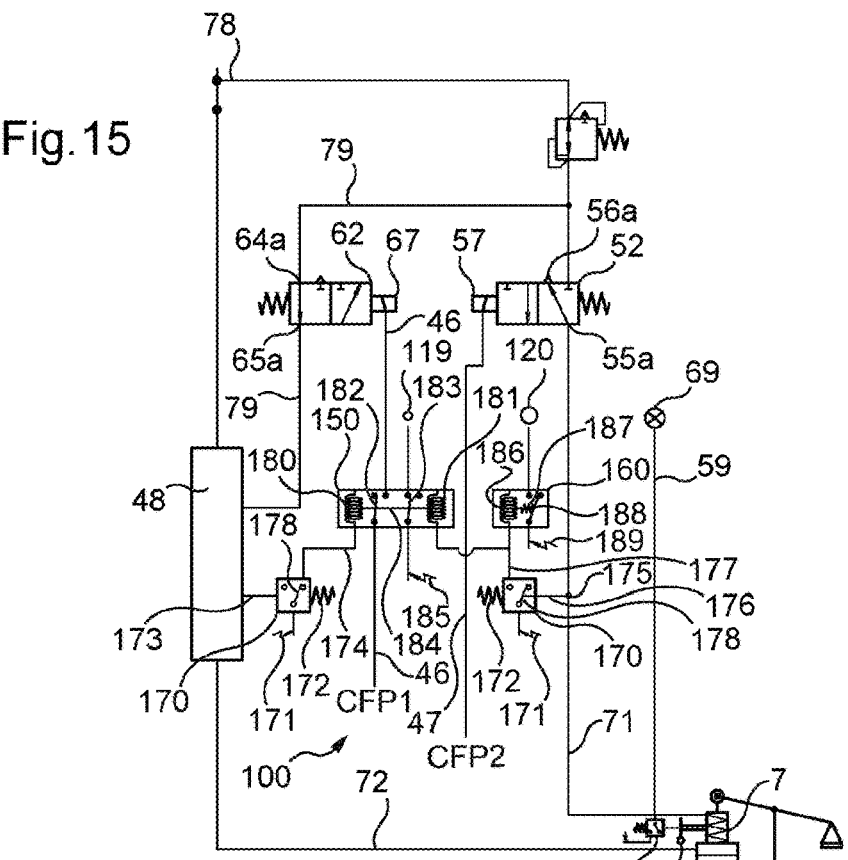
FIGS. 15 and 16 are similar views to those of FIGS. 3 and 4, showing a device for detection and memorization of the application of the parking brake in accordance with a second embodiment.
Figure 16:
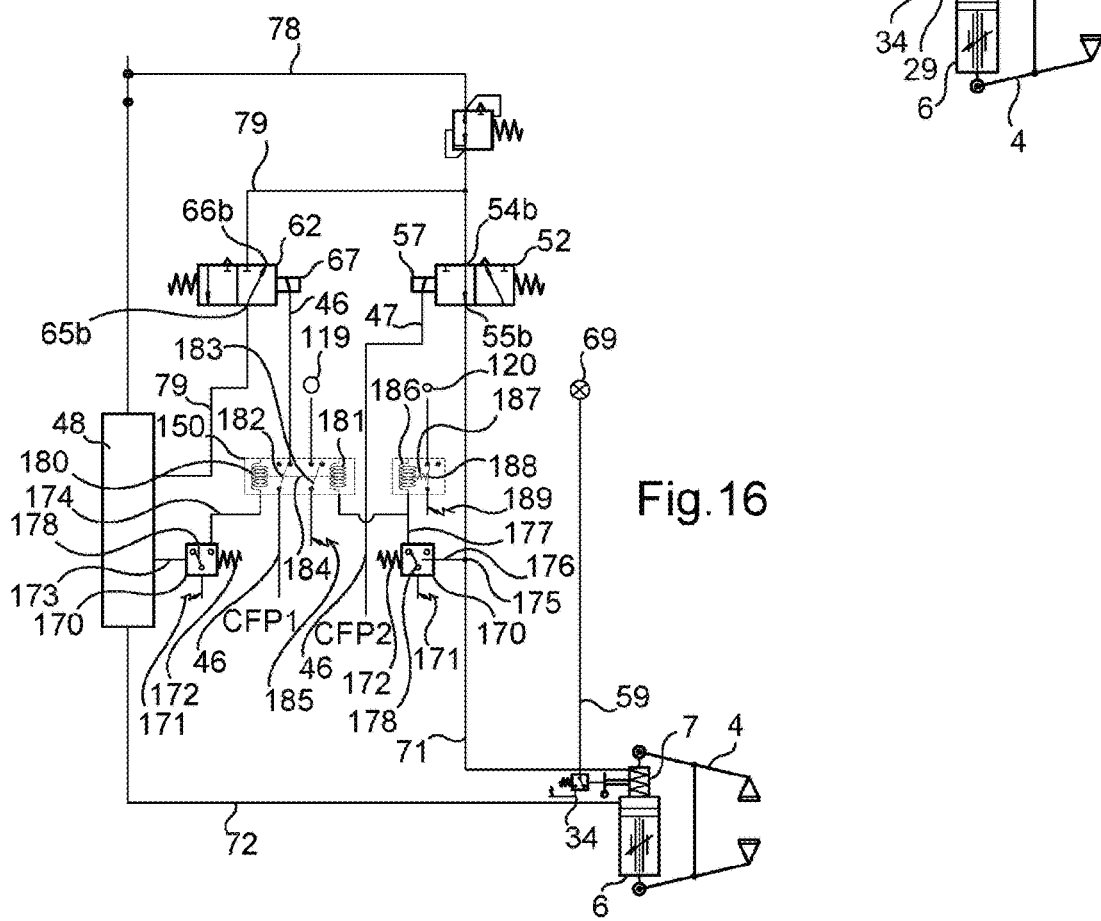

FIGS. 15 and 16 represent a system provided with a detection and memorization device 100 in accordance with a second embodiment.

Here, the actuator 67 of the second distributor 62 is configured to receive a parking brake application setting CFP1 by a dedicated first control line 46; whereas the actuator 57 of the first distributor 52 is configured to receive a parking brake application setting CFP2 by a dedicated second control line 47.

The device 100 comprises a first controller 160 configured to electrically supply or not supply an indicator light 120 by virtue of an electricity supply source 189.

The device 100 further comprises a second controller 150 interposed on the first control line 46 and configured to configured to cause the parking brake application setting CFP1 to be conveyed or not conveyed to the actuator 67 of the second distributor 62, and furthermore configured to electrically supply or not supply an indicator light 119 by virtue of an electricity supply source 185.

The device 100 further comprises two conditional management members 170 each provided with a switch 178, with a return member 172 cooperating with the respective switch 178 and each receiving a supply signal 171.

A first of the two conditional management members 170 is connected by a first section of pipe 176 to the parking brake pipe 71 via a tapping 175, and is also connected by a second section of pipe 177 both to the first controller 160 and to the second controller 150.

A second of the two conditional management members 170 is connected by a third section of pipe 173 to the sub-unit 48 and in particular to the brake pipe 72, between the relay device 93 and the anti-wheel-slide device 98, and also connected by a fourth section of pipe 174 to the second controller 150.

The first controller 160 comprises a first electric coil 186 connected to the second section of pipe 177, a first switch 188 configured to be actuated to a working position by the first electric coil 186 when it is powered, and a return spring 187 configured to return the switch 188 to a resting position when the first electric coil 186 is not powered.

The second controller 150 comprises a second electric coil 180 connected to the fourth section of pipe 174, a third electric coil 181 connected to the second section of pipe 177, as well as a second switch 182 and a third switch 183 mechanically connected to the second switch 182 by an interface 184; the second and third switches 182 and 183 being configured to be actuated together to a working position by the second electric coil 180 when it is powered and the third electric coil 181 is not powered, and to a resting position by the third electric coil 181 when it is powered and the second electric coil 180 is not powered.

In FIG. 15, by the CFP2 control, the first distributor 52 is in its first position with its single outlet aperture 55a connected to its aperture 56a opening into the atmosphere; so as to enable the venting of the parking brake pressure chamber 25.

If required, the switch 178 of the first of the two conditional management members 170 does not establish an electrical path between the supply 171 and the second section of pipe 177 and does not power the first and third electric coils 186 and 181.

Thus, the first switch 188 is not acted upon by the first coil 186 and does not establish an electrical path either, between the supply 189 and the indicator light 120, which is thus off.

The second distributor 62 is in its first position, in which its single inlet aperture 64a and its single outlet aperture 65a communicate, to supply the service brake pressure chamber 13 with the third pneumatic pressure agent.

The switch 178 of the second of the two conditional management members 170 establishes an electrical path between the supply 171 and the fourth section of pipe 174 and thus powers the second electric coil 180.

The second and third switches 182 and 183 are then actuated into their working position by the second coil 180, thereby establishing an electrical path between the supply 185 and the indicator light 119 which is thus on.

This indicator 119 thus makes it possible to indicate that the parking brake 7 is applied.

It will be noted that this indication is memorized and kept even if the pressure value in the brake pipe 72 reduces or cancels out (for example due to leakages), since the second controller 150 has no return spring for the second and third switches 182 and 183, which therefore remain in their working position.

In FIG. 16, by the CFP2 control, the first distributor 52 is in its second position with its single inlet aperture 54b communicating with its single outlet aperture 55b to supply the parking brake pressure chamber 25.

If required, the switch 178 of the first of the two conditional management members 170 establishes an electrical path between the supply 171 and the second section of pipe 177 and powers the first and third electric coils 186 and 181.

Thus, the first switch 188 is acted upon by the first coil 186 and establishes an electrical path between the supply 189 and the indicator light 120, which is thus on.

This indicator 120 thus makes it possible to indicate that the parking brake 7 is not applied.

The pressure value in the brake pipe 72 is such that the switch 178 of the second of the two conditional management members 170 does not establish an electrical path between the supply 171 and the fourth section of pipe 174 and thus does not power the second electric coil 180.

The second and third switches 182 and 183 are thus actuated into their resting position by the third coil 181, thus cutting the electrical path between the supply 185 and the indicator light 119 which is thus off and furthermore authorizing the control CFP1 to pass to the actuator 67 of the second distributor.

The second distributor 62 is in its second position in which its single outlet aperture 65b communicates with its aperture 66b opening into the atmosphere.

In a variant not illustrated, the distributors 52 and 62 are doubled by other first and second distributors disposed in series with the first and second distributors.

In a variant not illustrated, the unit may comprise a parking brake test device provided with test lines connected to the actuators of the distributors.

In a variant embodiment not illustrated, the distributors 52 and 62 are configured such that the parking brake 7 must not be applied when the application setting of the parking brake CFP is null. This is what is referred to as an availability application.

The difference relative to the distributors illustrated in FIGS. 2 to 4 lies in the fact that the first and second respective positions are swapped.

In other words, when the application setting of the parking brake CPF is null, the first distributor 52 has a first position by default referred to as an availability position in which its single outlet aperture 55a connected to the parking brake pipe 71 communicates with its single inlet aperture 54a connected to the control pipe 78, whereas its aperture opening into the atmosphere 56a is obturated.

As regards the second distributor 62, this has a first position by default also referred to as an availability position in which its single outlet aperture 65a communicates with its aperture 66a open to the atmosphere, whereas its single inlet aperture 64a connected to the control pipe 78 is obturated.

On the contrary, when the application setting of the parking brake CPF is not zero, the first distributor 52 has a second position in which its single outlet aperture 55b communicates with its aperture opening into the atmosphere 56b, whereas its single inlet aperture 54b is obturated; and as regards the second distributor 62, this has a second position in which its single outlet aperture 65b communicates with its single inlet aperture 64b, whereas its aperture 66b open to the atmosphere is obturated.

In variants that are not illustrated:
- the distributors are bistable rather than monostable, they each comprise two actuators and the unit is provided with two control lines each connected to an actuator on each distributor;
- the rail vehicle braking system may comprise a service brake lacking a wedge part attached to the braking piston, such that this piston acts directly on the thrust rod, which acts on the deformable levers; and in that case, the braking piston together with its notched rod and the thrust rod are movable in the second axial direction whereas the parking brake is configured such that the blocking finger and the holding piston are movable in the first axial direction;
- the rail vehicle braking system has a braking linkage different from that illustrated in the Figures, in particular the braking linkage comprises a block configured to act directly on a wheel of the rail vehicle, that block being directly jointed by a pivot type joint fastened to the thrust rod, a rigid lever fastened to the body of the system as well as a deformable lever fastened both to the rigid lever and to the joint on the block; and/or
- the rail vehicle braking system comprises a braking linkage configured to act on a brake having blocks as described above and is provided with a service brake with or without a wedge part attached to the braking piston.

It should be noted more generally that the invention is not limited to the examples described and represented.

The invention claimed is:

1. A rail vehicle braking system having brakes with at least one lining or block, the braking system comprising:
a first body;
a braking linkage configured to operate on at least one of said brakes;

a service brake comprising a braking piston movable relative to said first body to actuate said braking linkage, and delimiting with said first body a service brake pressure chamber configured to be supplied by a first pneumatic pressure agent to place said braking piston in a service braking position;

a parking brake configured to actuate said braking piston of said service brake and having a working configuration and a resting configuration, said parking brake comprising a blocking device movable relative to said first body to actuate said braking piston, said blocking device movable between a first position and a second position, the blocking device, when said parking brake is in the working configuration, being in said second position wherein said blocking device immobilizes said braking piston in the service braking position thereof;

a control device movable relative to said first body and having a locking position in which said control device holds said blocking device in the second position thereof;

a second pneumatic pressure agent configured to supply the service brake pressure chamber so as to apply a determined braking force when said parking brake is in the working configuration thereof; and a detection and memorization device, configured to determine and memorize, from a detected position of the blocking device and from a detected supply of the service brake pressure chamber from the second pneumatic pressure agent, whether the parking brake is applied, wherein a memorization of application of the parking brake is maintained by the detection and memorization device even if the service brake pressure chamber is no longer supplied by the second pneumatic pressure agent.

2. The system according to claim 1, wherein said control device and said first body delimit a parking brake pressure chamber configured to be supplied by a third pneumatic pressure agent, said parking brake pressure chamber having a locking position in which said control device keeps said blocking device in the second position thereof, and wherein said detection and memorization device determines the position of the blocking device via a pressure value of said third pneumatic pressure agent measured in a parking brake pipe that supplies said parking brake pressure chamber.

3. The system according to claim 2, further comprising:

a dedicated first pneumatic distribution device connected to a reservoir in order to alternately supply said parking brake pressure chamber with said third pneumatic pressure agent and vent said parking brake pressure chamber in a manner that places said parking brake, respectively, in the resting configuration thereof and the working configuration thereof;

a dedicated second pneumatic distribution device connected to said reservoir and connected to said service brake pressure chamber in order to supply said service brake pressure chamber with the second pneumatic pressure agent so as to apply the determined braking force when said parking brake is in the working configuration thereof, said dedicated first and second pneumatic distribution devices being configured to be controlled by at least one control signal.

4. The system according to claim 2, wherein said detection and memorization device includes each of:

a second body;

a detection piston movably mounted in the second body and defining said second body a first detection chamber and a second detection chamber distinct from the first detection chamber;

an elastic return member disposed in the second detection chamber and configured to actuate the detection piston; and a memory member moveably mounted in the second body, the memory member defining with the body a locking chamber in fluidic communication with the second detection chamber and being configured to actuate the detection piston via a return spring so as to keep the detection piston in a predetermined position.

5. The system according to claim 4, wherein the second body includes a first detection aperture opening into the first detection chamber and in communication with a first detection pipe connected to a pipe supplying the service brake pressure chamber, the first detection chamber being configured to be supplied, via the first detection pipe, by the second pneumatic pressure agent when the second pneumatic pressure agent supplies the service brake pressure chamber, and further configured to be vented when the second pneumatic pressure agent does not supply the service brake pressure chamber.

6. The system according to claim 4, wherein the second body also includes a second detection aperture opening into the second detection chamber and in communication with a second detection pipe connected to a pipe that supplies the parking brake pressure chamber, the second detection chamber being configured to be supplied, via the second detection pipe, by the third pneumatic pressure agent when the third pneumatic pressure agent supplies the parking brake pressure chamber, and further configured to be vented when the third pneumatic pressure agent does not supply the parking brake pressure chamber.

7. The system according to claim 4, wherein said detection and memorization device also includes an indication unit with plural indicator lights, a supply signal, a switch, and a return spring that cooperates with the switch, said detection and memorization device configured such that movement of the memory member in the second body permits the switch to operate against the return spring to supply one of the indicator lights.

8. The system according to claim 4, wherein said detection and memorization device is configured such that, when the parking brake pressure chamber is vented, the second detection chamber and the locking chamber are not supplied, the detection piston is acted upon by the elastic return member, the memory member is acted upon by the return spring, and the first detection chamber is supplied by the second pneumatic pressure agent and acts upon the detection piston against the return member so as to place the detection piston in a first state in which the memory member comes to hold detection piston in position.

9. The system according to claim 4, wherein said detection and memorization device is configured such that, when the parking brake pressure chamber is supplied, the second detection chamber and the locking chamber are supplied, the detection piston is acted upon by the elastic return member and also by the third pneumatic pressure agent, the memory member is moved against the return spring, and the first detection chamber is not supplied by the second pneumatic pressure agent such that the detection piston is therefore in a second state in which the memory member does not act on the detection piston.

10. The system according to claim 4, wherein the detection piston has a groove formed on a periphery of the detection piston, located towards the second detection chamber and the memory member is housed in a cavity of the second body and is provided with an end head configured to come into engagement in the groove provided on the detection piston when the detection piston is in a first state in which the memory member comes to keep the detection piston in position.

11. The system according to claim 4, wherein the detection piston furthermore has a rib formed on a periphery of the detection piston located towards the second detection chamber, and the second body is provided with a shoulder against which said rib is configured to come into engagement, when the detection piston is in a second state in which the memory member does not act on the detection piston.

12. The system according to claim 10, wherein the detection piston is brought into a second state thereof by a first force equal to a sum of loads applied by the third pneumatic pressure agent and by the return member.

13. The system according to claim 10, wherein the detection piston is brought into the first state thereof by a second force equal to approximately the pressure value of the second pneumatic pressure agent, multiplied by a surface area of the detection piston on which the second pneumatic pressure agent acts, at the location of a free end of the detection piston.

14. The system according to claim 12, wherein the second force is greater than the load applied by the return member such that, in the a first state of the detection piston, a rib formed on a periphery of the detection piston is at a distance from a shoulder of the second body and the groove is aligned with and faces the end head of the memory member.

15. The system according to claim 12,
wherein the detection piston is subjected, at a free end, to the second force and remotely opposite to the free end, to the first force, and
wherein the detection and memorization device is configured such that the first force is greater than the second force.

16. The system according to claim 3, wherein said detection and memorization device includes a first controller configured to determine the position of the blocking device and also includes a second controller configured to determine the supply of the service brake pressure chamber from the second pneumatic pressure agent.

17. The system according to claim 16, wherein said detection and memorization device further includes two conditional management members each provided with a switch, a return member cooperating with each of the switches and each conditional management member configured to receive a supply signal,
a first of the two conditional management members being connected by a first section of pipe to a pipe supplying the parking brake pressure chamber, and also connected by a second section of pipe to both the first controller and the second controller, and
a second of the two conditional management members connected by a third section of pipe to a pipe supplying the service brake pressure chamber, and also connected by a fourth section of pipe to the second controller.

18. The system according to claim 17, wherein a first actuator is configured to receive a first parking brake application setting by a dedicated first control line, and a second actuator is configured to receive a second parking brake application setting by a dedicated second control line, the first controller configured to alternatively supply or not supply electricity to a first indicator light by virtue of a first electricity supply source, and
the second controller is interposed on the first control line and configured to cause the first parking brake application setting to alternatively be conveyed or not conveyed to the actuator, and further configured to alternatively supply or not supply electricity to a second indicator light by virtue of a second electricity supply source.

19. The system according to claim 17,
wherein the first controller includes a first electric coil connected to the second section of pipe, a first switch configured to be actuated to a working position by the first electric coil when the first electric coil is powered, and a return spring configured to return the first switch to a resting position when the first electric coil is not powered, and
wherein the second controller includes a second electric coil connected to the fourth section of pipe, a third electric coil connected to the second section of pipe, a second switch, and a third switch mechanically connected to the second switch by an interface,
the second and third switches being configured to be actuated together to a working position by the second electric coil when the second electric coil is powered and the third electric coil is not powered, and to a resting position by the third electric coil when the second electric coil is powered and the second electric coil is not powered.

20. The system according to claim 19, wherein, when the dedicated first pneumatic distribution device is controlled to enable the parking brake pressure chamber to be vented, the switch of the first of the two conditional management members does not establish an electrical path between the supply and the second section of pipe and does not supply the first and third electric coils, the first switch of the first controller is not acted upon by the first coil and does not establish an electrical path between the supply and a first indicator light, the second distribution device enables the service brake pressure chamber to be supplied with the second pneumatic pressure agent, the switch of the second of the two conditional management members establishes an electrical path between the supply and the fourth section of pipe and supplies the second electric coil, the second and third switches are actuated into their working position by the second coil, thus establishing an electrical path between the supply and the second indicator light, so as to indicate that the parking brake is applied.

21. The system according to claim 19, wherein, when the dedicated first pneumatic distribution device is controlled to enable the parking brake pressure chamber to be supplied, the switch of the first of the two conditional management members establishes an electrical path between the supply and the second section of pipe and supplies the first and third electric coils, the first switch is acted upon by the first coil and establishes an electrical path between the supply and a first indicator light, the switch of the second of the two conditional management members does not establish an electrical path between the supply and the fourth section of pipe and thus does not supply the second electric coil, the second and third switches are actuated into their resting position by the third coil, cutting the electrical path between the supply and the second indicator light, authorizing the parking brake signal to pass to the actuator of the second distribution device.

22. A method of braking a rail vehicle equipped with a rail vehicle braking system according to claim 1, comprising:
- receiving a first information representing a position of the blocking device;
- receiving a second information representing supply by the second pneumatic pressure agent of the service brake pressure chamber;
- determining from said first and second received information, a state of application of the parking brake; and
- memorizing said state of application of the parking brake.

23. The method according to claim 22, further comprising:
- controlling movement of the blocking device into the second position thereof so as to place the parking brake into the working configuration thereof and to control the supply of the service brake pressure chamber with the second pneumatic pressure agent so as to apply a determined braking force.

\* \* \* \* \*